Aug. 13, 1935.  A. H. RZEPPA  2,010,899
UNIVERSAL JOINT
Filed June 12, 1933   2 Sheets-Sheet 1
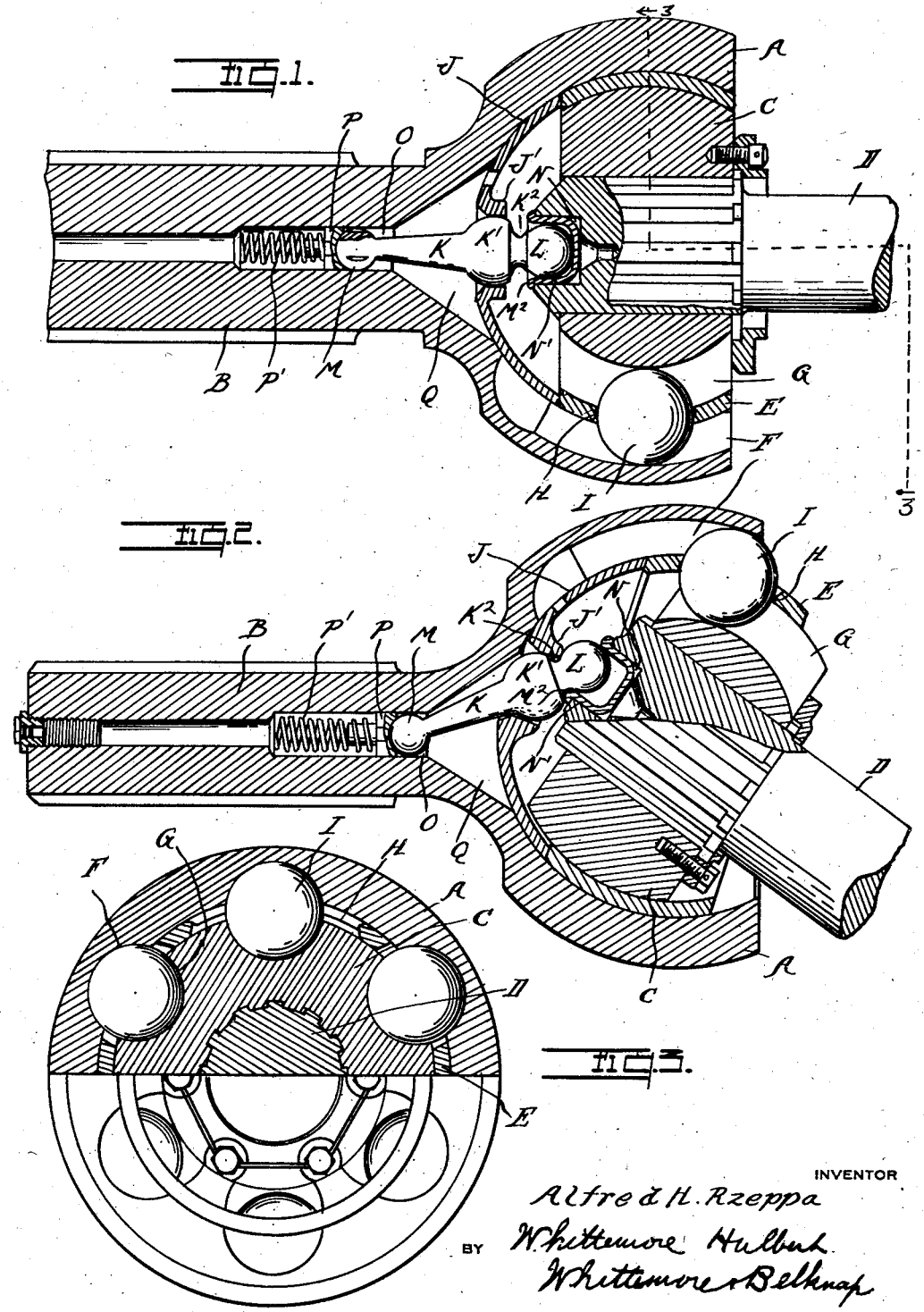
INVENTOR
Alfred H. Rzeppa
BY Whittemore Hulbert
Whittemore & Belknap
ATTORNEYS Aug. 13, 1935.    A. H. RZEPPA    2,010,899
UNIVERSAL JOINT
Filed June 12, 1933    2 Sheets-Sheet 2
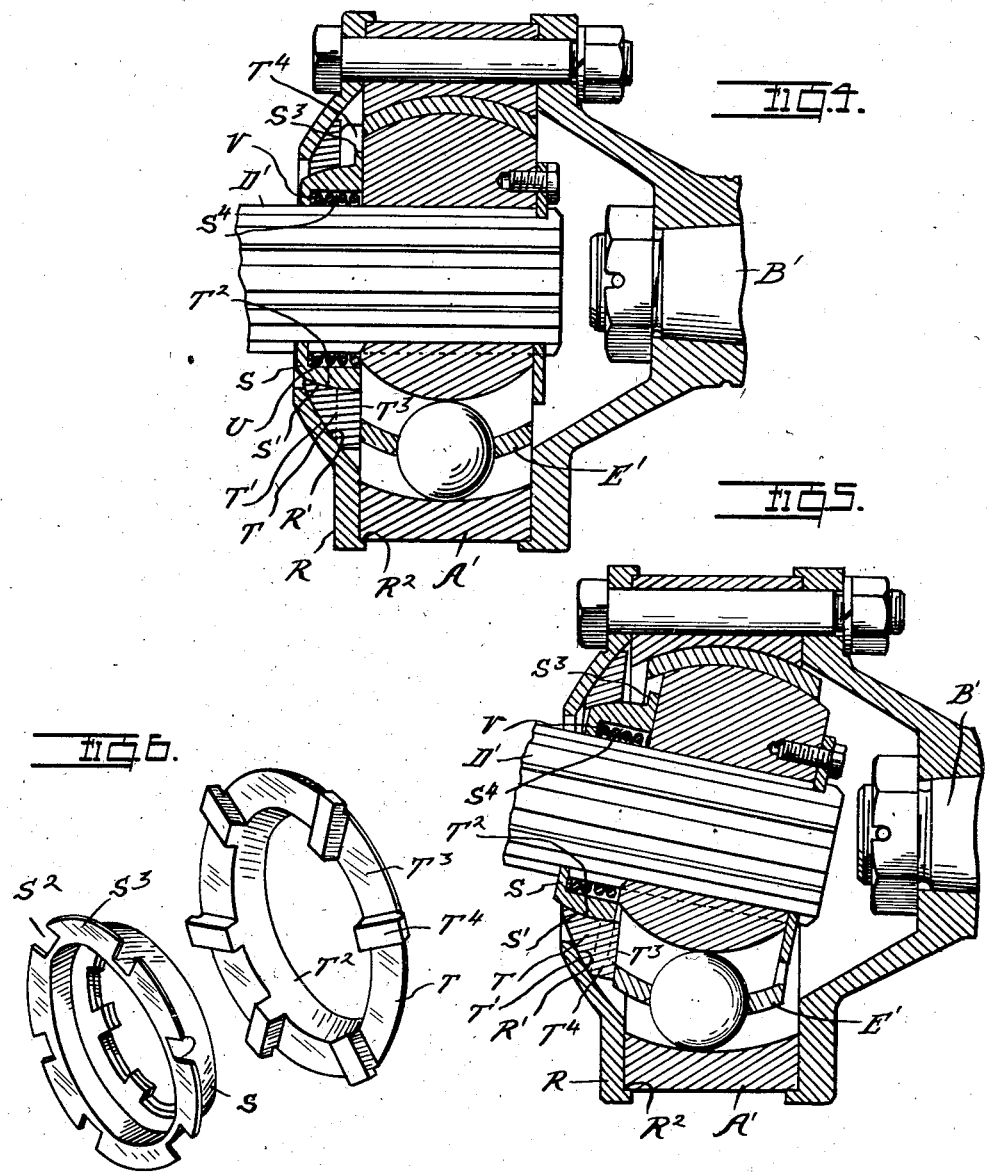
INVENTOR
Alfred H. Rzeppa
BY Whittemore Hulbert
Whittemore & Belknap
ATTORNEYS Patented Aug. 13, 1935

2,010,899

UNITED STATES PATENT OFFICE 2,010,899

UNIVERSAL JOINT

Alfred H. Rzeppa, Detroit, Mich.

Application June 12, 1933, Serial No. 675,496

16 Claims. (Cl. 64—91)

The invention relates to universal joints of that type comprising concentrically arranged spherical members coupled to each other by a series of balls engaging meridian race grooves in the adjacent faces of such members. It is well understood that joints of this type will transmit constant speed rotation between the two members provided that the balls which transmit the torque are arranged in a plane midway between the plane of rotation of the two members when their axes are in angular relation. To hold the balls in such position constructions have been devised in which the balls are held in a spherical cage member intermediate the spherical inner and outer members attached to the respective shafts. This spherical cage member has a circumferential series of slots therein for holding the balls and when the shafts are at some considerable angle to each other, the combined effect of the grooved race members and slots in the cage will adjust the latter to the desired midposition. However, when the shafts are adjusted angularly from a position at or near axial alignment, there is nothing in the structure to compel the adjustment of the cage to the midposition. This is particularly true where the shafts at the time of angular adjustment are not rotating, and as a consequence there will be a binding action which will resist or prevent the desired angular adjustment.

It is the object of the present invention to provide a universal joint of the type above described with means for positively adjusting the cage member to the mid-position whenever there is angular adjustment of the shafts in relation to each other, and whether or not the shafts are rotating. To this end the invention consists in the novel construction as hereinafter set forth.

In the drawings:

Fig. 1 is a longitudinal section through the universal joint showing one type of pilot construction for effecting proper adjustment of the cage;

Fig. 2 is a similar view showing the shafts at extreme angular adjustment in relation to each other;

Fig. 3 is a cross section on line 3—3 of Fig. 1;

Fig. 4 is a view similar to Fig. 1 showing a modified construction of pilot mechanism.

Fig. 5 is similar to Fig. 4 with the parts in a different position of adjustment;

Fig. 6 is a perspective view showing the members of the construction shown in Figs. 4 and 5.

The universal joint to which my improvements are applied comprises an outer hollow spherical member A which as shown is formed integral with a shaft B, an inner spherical member C having a positive engagement with a shaft D and a spherical cage member E fitting between the members A and C with only working clearance. The member A is provided with a series of meridian groove ball races F, the axes of which if prolonged would center in the axis of the shaft B. In the same manner, the inner member C is provided with a series of meridian groove ball races G, the axes of which if prolonged would center in the shaft D. The cage member E has circumferential slots H therein which receive the balls I, which latter also engage the race members F and G. The construction just described is shown in my former Patent No. 1,665,280 of April 10, 1928, which also describes the manner of assembling the parts.

Broadly described, my improvement consists in a mechanical connection between the outer and inner spherical members and the intermediate spherical cage member which for each angular adjustment of the shafts in relation to each other will compel an adjustment of the cage to hold the balls therein in a plane midway between the plane of rotation of the respective shafts. This broad organization may be embodied in various specific structures and in the drawings I have illustrated two. The construction shown in Figs. 1 to 3 is adapted particularly for joints designed for relatively large angular adjustment. The construction shown in Figs. 4 and 5 is more particularly intended for use where there is a more limited angular adjustment of the shafts in relation to each other.

With the structure shown in Figs. 1 to 3, a segmental spherical member J complementary to the cage member E is placed adjacent thereto and is arranged within the spherical socket member A. This member J is centrally apertured and is provided with an inwardly extending flange J' forming a cylindrical bearing. K is a pilot pin or lever having a spherical portion K' which engages the cylindrical bearing in the flange J' and also provided at its opposite ends with spherical portions L and M. The portion L engages a socket N in the end of the shaft D which socket is preferably provided with a bearing bushing N' for fitting said member L. The spherical portion M engages a cylindrical axial recess O in the shaft member B and also engages an end thrust bearing P which is yieldably pressed thereagainst by a spring P'. This has the effect of holding the member K with the portion L in engagement with the bushing N' in all positions of angular adjustment of the shafts. As illustrated in Fig. 2, when the shafts B and D are moved angularly with respect to each other, the pin or lever K will also be moved within the clearance provided by a conical recess Q in the member A. During such angular adjustment, the end thrust bearing B will move longitudinally in the cylindrical recess O under the actuation of the spring F' so as to hold the member K in contact with the bushing N'. At the same time the intermediate spherical portion K' will cause a movement of the segmental spherical member J and through its contact with the cage member E a corresponding movement to the latter. The amount of such movement angularly about the center of the joint is one-half the relative angular movement of the shafts about said center which will have the effect of placing the balls I in a plane midway between the planes of rotation of the respective shafts.

It will be noted that in this extreme position of angular adjustment of the member K the spherical end L is partially withdrawn from the socket but maintains contact with the bushing N', which latter is provided with a rounded flange M² for engaging a grooved neck portion K² in the member K intermediate the portions K' and L. By reason of this and also because of the proportion of the arms of the member K on opposite sides of a spherical portion K', the adjustment of the member J in all positions of angular adjustment of the shafts very closely approximates a mid-angular position. Furthermore, the accuracy of adjustment is greatest when the angular adjustment of the shafts with respect to each other is least, so that the cage is compelled to move at the time when there is no other force actuating to effect such movement. When, however, the shafts have been adjusted to some considerable angle, any further angular adjustment would cause the movement of the cage through the camming action of the race members and without the assistance of the pilot.

The construction shown in Fig. 4 is one which can be applied as an attachment to a construction of joint, such for instance as shown in my former patent above referred to, and wthout modification therein. It is also independent of either of the shafts connected by the joint whereas in the construction shown in Figs. 1 to 3, one of the shafts is integral with the outer socket member. As illustrated, R is a member which is clamped to one side of the outer spherical socket member A', being axially aligned therewith by a flange R² overlapping the periphery of said member A'. The member R has a spherical socket R' formed on its inner side, the center of which lies in the axis of the shaft B' which is coupled to the outer spherical member A'. The location of this center on the axis of the shaft is at one side of the center of the spherical joint. S is a member sleeved upon the shaft D' and splined thereon to rotate therewith and with the member C. The outer face S' of this member S is spherical and the center of the sphere lies in the axis of the shaft D'. The spacing of this center from the center of the spherical joint is equal to the spacing of the center of the member F from said center of the joint but on the opposite side of said center. T is a member which has its outer face T' spherical to fit the member R, and an inner face T² spherical to fit the member S. A third flat face T³ bears against the side of the cage member E'. This member T is also coupled to rotate with the member S and shaft D' and to this end the face T³ is formed by spaced lugs which engage notches S² in a flange S³ on the member S. The arrangement is such that when there is an angular movement of the shaft B' relative to the shaft D', there will be a corresponding relative movement between the members R and S. This will also cause a movement of the member T but by reason of the fact that the spherical surfaces R' and S' are nonconcentric and diverging, the angular adjustment of the member T will be only half of the relative angular adjustment of the members R and S. In other words, the members R and S are compelled to move about the common center of the joint, whereas the member T moves about two centers respectively in the axis of the shafts B' and D' and upon opposite sides and equal distances from said common center. The effect is to cause said member T to move about the common center one-half the relative angular movement about said center of the members R and S.

In order to retain the lubricant within the joint, it has been customary to provide a spherical sealing flange on the outer socket member A' which is engaged by a cooperating spherical sealing flange on the shaft D'. With my improved construction of pilot this sealing function is performed by the elements R, S, T and without the necessity of anything additional other than resilient means for holding these members in contact. As specifically shown a spring U is arranged in a recess S⁴ in the member S and surrounds the shaft B', said spring abutting at one end against a sealing washer V and at its opposite end against the member C'. This wi'l hold the surfaces R' and T' in contact and also the surface S' and T² in contact while the washer V seals between the member S and the shaft D'.

In the functioning of the pilot during angular relative displacement of the shafts there will be a radial movement imparted to the member T which necessitates a radial length in the face T³ sufficient to maintain its contact with the cage member. As this would cause an overlapping of both the inner and outer spherical members, it would if continuous interfere with their relative displacement. This difficulty I have avoided by forming the face T³ on staced lugs T⁴ which register with the ball races in said outer and inner members, the latter providing clearance for said lugs during angular displacement of the joint.

What I claim as my invention is:

1. The combination with a universal joint of the type comprising inner and outer spherical members having meridian ball race grooves therein, balls engaging said ball races and a spherical cage member intermediate said spherical inner and outer members for retaining said balls, of a linkage between said spherical members for compelling an angular movement of said cage member which is substantially one-half the relative angular movement of said outer and inner spherical members.

2. The combination with a universal joint of the type comprising inner and outer spherical members having meridian ball race grooves therein, balls engaging said ball races and a spherical cage member intermediate said spherical inner and outer members for retaining said balls, of a member other than the aforesaid members and balls actuated by relative angular displacement of said outer and inner spherical members for positively actuating said cage member substantially one-half of said angular displacement.

3. The combination with a universal joint of the type comprising inner and outer spherical members having meridian ball race grooves therein, balls engaging said ball races and a spherical cage member intermediate said spherical inner and outer members for retaining said balls, of a member having a pivotal engagement with said outer and inner spherical members, and a bearing on said cage member for displacing the latter substantially one-half the relative angular displacement of said outer and inner spherical members.

4. The combination with a universal joint of the type comprising shaft members, inner and outer spherical members having meridian ball race grooves therein respectively mounted on said shaft members, balls engaging said ball races, a spherical cage member intermediate said spherical inner and outer members apertured for receiving and retaining said balls, of a lever having its opposite ends pivotally engaging bearings in said shaft members and having an intermediate bearing on said cage member, said lever being positioned and proportioned to impart to said cage member substantially one-half the relative angular displacement of said shaft members.

5. The combination with a universal joint of the type comprising shaft members, inner and outer spherical members having meridian ball race grooves therein mounted respectively on said shaft members, balls engaging said ball races and a spherical cage member intermediate said inner and outer members apertured for receiving and retaining said balls, of a lever having one end engaging an axial socket in the inner end of the shaft for said inner spherical member with its outer end having a pivotal sliding engagement with an axial recess in the shaft for said outer spherical member, and an intermediate bearing on said spherical cage member, said lever being proportioned and positioned to impart substantially one-half the angular displacement to said cage member of the relative angular displacement of said inner and outer spherical members.

6. The combination with a universal joint of the type comprising shaft members, inner and outer spherical members respectively mounted on said shaft members and each provided with meridian ball race grooves therein, balls engaging said ball races, and a spherical cage member intermediate said spherical inner and outer members apertured for receiving and retaining said balls, of a lever having a spherical end engaging an axial socket in the end of the shaft for said inner spherical member, said socket being located at one side of the common center for said spherical members, the opposite end of said lever having a spherical portion engaging a cylindrical axial recess in the shaft for said outer spherical member, said recess having a flaring portion permitting angular displacement of said lever therein, said lever having an intermediate spherical bearing for engaging a cylindrical recess in said cage member and being positioned and proportioned to impart to said cage member angular displacement substantially one-half of the relative angular displacement of said shaft members; an end thrust bearing for said lever in the cylindrical recess of the shaft for the outer spherical member, and resilient means for pressing said end thrust bearing against said shaft.

7. The combination with a universal joint of the type comprising shaft members, inner and outer spherical members mounted respectively on said shaft members, each provided with meridian ball race grooves having their poles in the axes of said shafts, balls in said grooves and a segmental spherical cage member intermediate said spherical inner and outer members apertured for receiving and retaining said balls, of a lever having a spherical portion at one end engaging an axial socket in the end of the shaft for said inner spherical member, said socket being located at one side of the common center for said spherical members, the opposite end of said lever having a spherical portion engaging a cylindrical axial recess in the shaft for the outer spherical member, said recess being flared to provide clearance for said lever when said shafts are in angular relation and a segmental spherical member complementary to said segmental spherical cage member apertured to engage an intermediate spherical bearing on said lever, an end thrust bearing for said lever in the cylindrical recess of the shaft for the outer spherical member, and resilient means for pressing said bearing against said lever, said lever being proportioned and positioned to impart to said cage member an angular displacement substantially one-half the angular displacement of said shaft members.

8. The combination with a universal joint of the type comprising inner and outer segmental spherical members having meridian ball race grooves therein, balls engaging said ball races and a segmental spherical cage member intermediate said spherical inner and outer members apertured for receiving and retaining said balls, of an external pilot attachable to said universal joint for compelling an angular movement of said cage member substantially one-half the relative angular displacement of said inner and outer spherical members.

9. The combination with a universal joint of the type comprising shaft members, inner and outer segmental spherical members for mounting respectively on said shaft members, each having meridian ball race grooves therein, balls engaging said ball races and a segmental spherical cage member intermediate said spherical inner and outer members apertured for receiving and retaining said balls, of an external pilot attachable to said universal joint comprising segmental spherical bearings mounted respectively on one side of said inner and outer spherical members, and having their centers in the axes of their respective shafts and spaced equally on opposite sides of the common center of said spherical members, and an intermediate member having spherical surfaces engaging said segmental spherical bearings, and a third surface radially slidably engaging said segmental spherical cage member.

10. The combination with a universal joint of the type comprising shaft members, inner and outer segmental spherical members for mounting respectively on said shaft members, each having meridian ball race grooves therein, balls engaging said ball races and a segmental spherical cage member intermediate said spherical inner and outer members apertured for receiving and retaining said balls, of an external pilot and oil sealing means attachable to said universal joint comprising segmental spherical bearings mounted respectively on one side of said inner and outer spherical members, and having their centers in the axes of their respective shafts and spaced equally on opposite sides of the common center of said spherical members, an intermediate member having spherical surfaces engaging said segmental spherical bearings, and a third surface radially slidably engaging said segmental spherical cage member, and resilient means for holding the members of said pilot in oil sealing contact with each other.

11. The combination with a universal joint of the type comprising shaft members, inner and outer spherical members for mounting on the respective shaft members, said inner spherical member having a splined engagement with its shaft, each of said spherical members being provided with meridian ball race grooves therein, balls engaging said ball races and a segmental spherical cage member intermediate said spherical inner and outer members apertured for receiving and retaining said balls, of an external pilot comprising a member clamped to one side of said outer spherical member and having concave segmental spherical bearing surfaces concentric with a point in the axis of the shaft for said outer spherical member and at one side of the common center for said spherical members, a member sleeved upon and splined to the shaft for the inner spherical member provided with a convex segmental spherical bearing face concentric with a point in the axis of said shaft spaced from the common center of said spherical members a dimension equal to the spacing of the center of said concave spherical bearing on the opposite side of said common center, an intermediate member having segmental spherical surfaces for engaging said spherical bearings and radially extending spaced bearings engaging the edge of said cage member, said radial bearings being located to register with said grooved race members so as to avoid interference with said outer and inner spherical members when said shafts are angularly displaced.

12. A pilot attachment for universal joints of the type comprising segmental spherical inner and outer members and an intermediate cage member, said pilot comprising segmental spherical bearings attached respectively to said inner and outer members and having their centers in the axes of their respective shafts and equally spaced on opposite sides of the common center of the joint and an intermediate member having spherical surfaces for engaging said spherical bearings, and a third surface for engaging said cage member whereby the latter will be compelled to move substantially one-half the relative angular displacement of said outer and inner members.

13. A pilot attachment for universal joints of the type comprising segmental spherical inner and outer members and an intermediate cage member, said inner and outer members having meridian ball race grooves therein and balls in said grooves, said pilot comprising segmental spherical bearings attached respectively to said inner and outer members at one side thereof, the centers of said bearings lying in the axes of their respective shafts and spaced equally upon opposite sides of the common center of said spherical members, and an intermediate member having spherical surfaces for engaging said spherical bearings and spaced lugs registering with the meridian grooves in said outer and inner members and having a radial sliding engagement with the side of said cage member.

14. A combined pilot and oil seal attachment for universal joints of the type comprising concentric segmental inner and outer members and an intermediate cage member, said inner and outer members having meridian grooves therein and balls in said grooves engaging apertures in said cage member, said attachment comprising a member having a flange engagement with the periphery of said outer segmental member to be arranged concentric therewith and provided with a concave segmental spherical bearing having its center in the axis of the shaft for said outer segmental member spaced on one side of the common center for the joint, a member bearing against the side of said inner segmental spherical member provided with an external segmental spherical bearing having its center in the axis of its shaft and spaced on the opposite side of the common center of the joint equal to the spacing of said first mentioned center, and a member intermediate said segmental bearing members provided with spherical surfaces for respectively engaging the same and a series of radially extending spaced lugs registering respectively with said meridian grooves and bearing on the edge of said cage member, and resilient means for pressing all of said pilot members in sealing contact with each other to form an oil seal.

15. The combination with a universal joint of the type comprising inner and outer segmental spherical members having meridian ball race grooves therein, balls engaging said ball race grooves, of means other than the aforesaid members and balls for positively compelling an angular displacement of the plane of rotation of the balls, substantially one-half the relative angular displacement of said inner and outer spherical members.

16. The combination with a universal joint of the type comprising shaft members, inner and outer segmental spherical members for mounting respectively on said shaft members, each having meridian ball race grooves therein, balls engaging said ball race grooves, and a segmental spherical cage member intermediate said spherical inner and outer members apertured for receiving and retaining said balls, of a pilot comprising segmental spherical bearings respectively on said inner and outer spherical members and having their centers in the axes of their respective shafts and spaced equally on opposite sides of the common center of said spherical members, and an intermediate member having spherical surfaces engaging said segmental spherical bearings and a third surface radially slidably engaging said cage member.

ALFRED H. RZEPPA.